Figure 1:
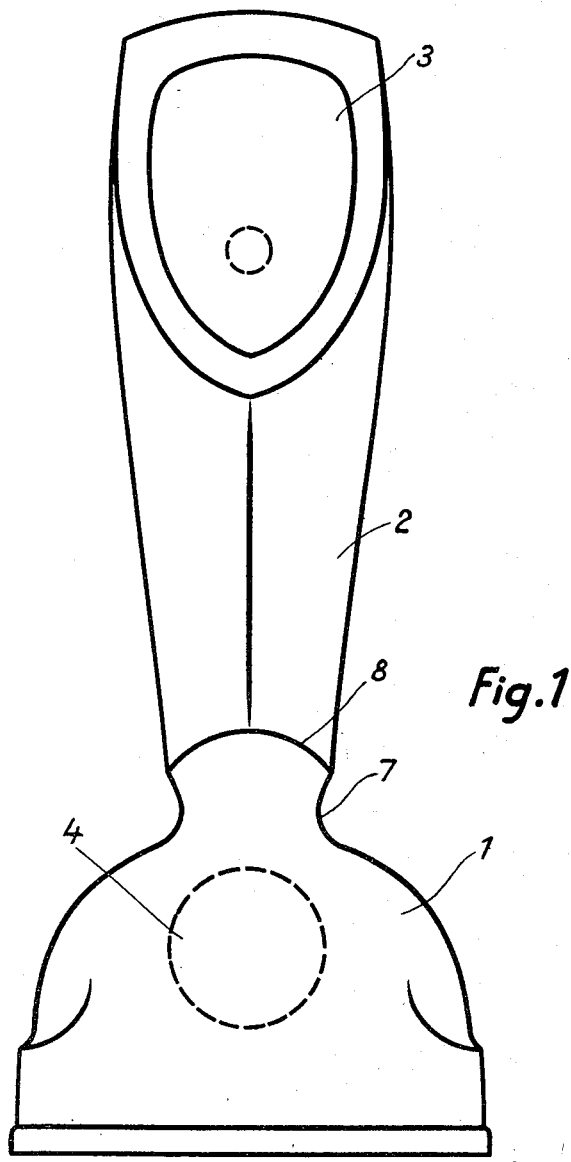

Feb. 4, 1958  K. H. BLOMBERG ET AL  2,822,432
CASING FOR TELEPHONE INSTRUMENTS
Filed Dec. 29, 1951  4 Sheets—Sheet 1

Inventors
K. H. Blomberg
H. E. Lindström
H. G. Thames
By Hascock Downing Seebold
Attys.

Feb. 4, 1958 K. H. BLOMBERG ET AL 2,822,432
CASING FOR TELEPHONE INSTRUMENTS
Filed Dec. 29, 1951 4 Sheets-Sheet 2

Inventors
K. H. Blomberg
H. E. Lindström
H. G. Thames

Inventors
K.H. Blomberg
H.E. Lindström
H.G. Thames
By Glascock Downing Seebold
Attys.

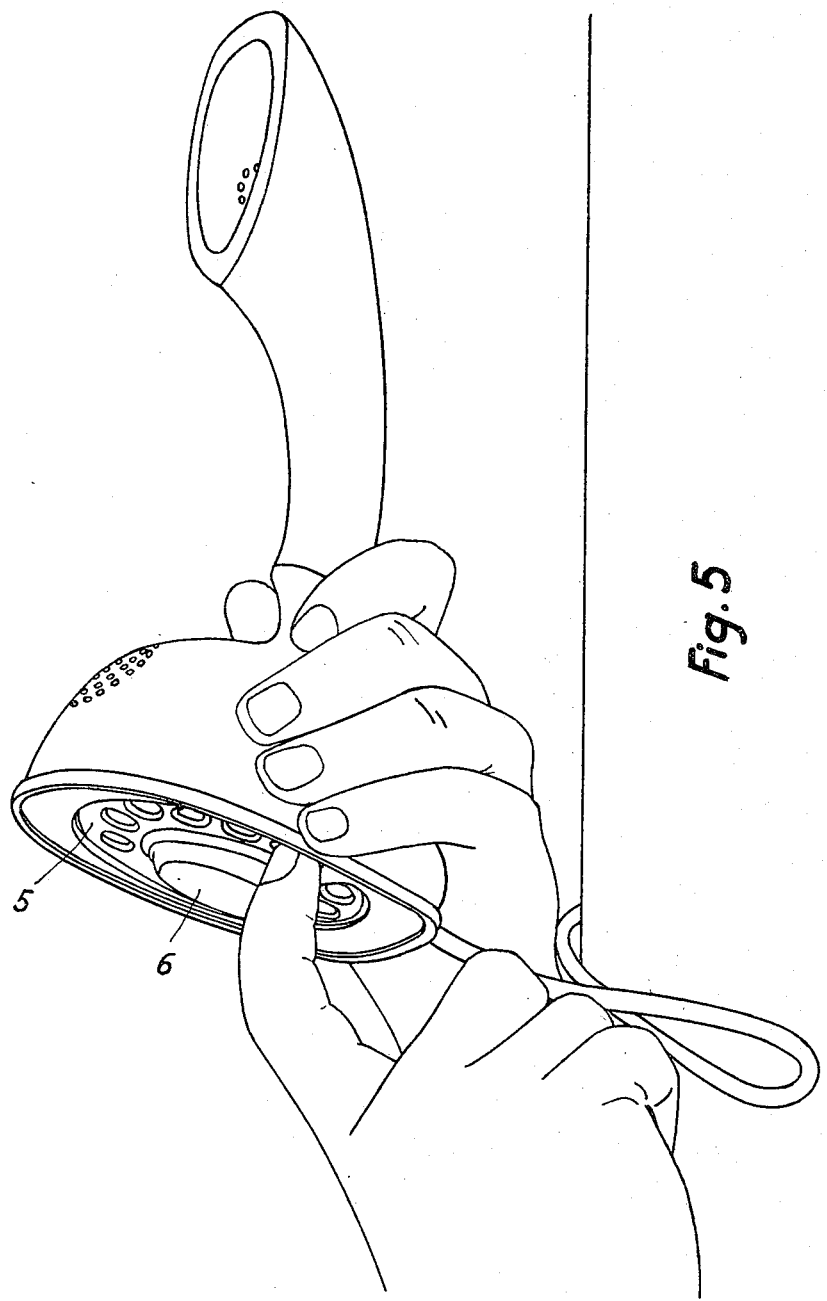

United States Patent Office 2,822,432
Patented Feb. 4, 1958

2,822,432

CASING FOR TELEPHONE INSTRUMENTS

Knut Hugo Blomberg, Appelviken, Helge Edward Lindström, Stuvsta, and Hans Gösta Thames, Hagersten, Sweden, assignors to Telefonaktiebolaget L M Ericsson, Stockholm, Sweden, a company of Sweden Application December 29, 1951, Serial No. 264,114

Claims priority, application Sweden January 25, 1951

2 Claims. (Cl. 179—103)

The invention refers to telephone instruments of the standing micro-telephone type. In order to obtain a convenient handling of instruments of such a type, it must be possible, after having seized the instrument with the hand, and without being obliged to change the grasp round the instrument, to hold the instrument in both dialling and talking position without tiring tensions arising in the different parts of the hand and the arm. In talking position the instrument must be grasped round the handle between the microphone and the receiver. But when dialling, this grasp causes the hand to be bent backwards, with ensuing tension in the wrist, in order to place the dial in the correct dialling position. Furthermore, when the instrument is held in talking position, a grasp round the handle gives an undesirable twist of the hand, since the main part of the weight of the instrument is concentrated to the foot-portion of the instrument. The condition for a convenient handling is therefore that the instrument should be grasped far down, that is so that the foot rests in the hand. A further advantage of a low grasp is also that the mouthpiece for the microphone comes in a more advantageous position in relation to the mouth when the elbow rests against the front side of the body or against a table-top. If, on the other hand, the grasp is taken round the handle, the mouthpiece comes below the chin, if the instrument is held so that the tension in the hand is a minimum. Previously known instruments of this kind are not made so as to give a sufficiently convenient and firm grasp round the foot of the instrument, and therefore the caller often grasps the handle itself, which causes an unpleasant handling. The object of the invention is to eliminate these drawbacks and the invention is characterized by the handle being at the juncture between handle and foot provided with a groove running on the front and the sides of the handle, the height of said groove in the longitudinal direction of the handle approximately corresponding to the width of the thumb, so that when the instrument is grasped round the foot, the inside of the hand resting against the back of the foot, the thumb and possibly the forefinger will rest in the groove.

Figures 2, 3:
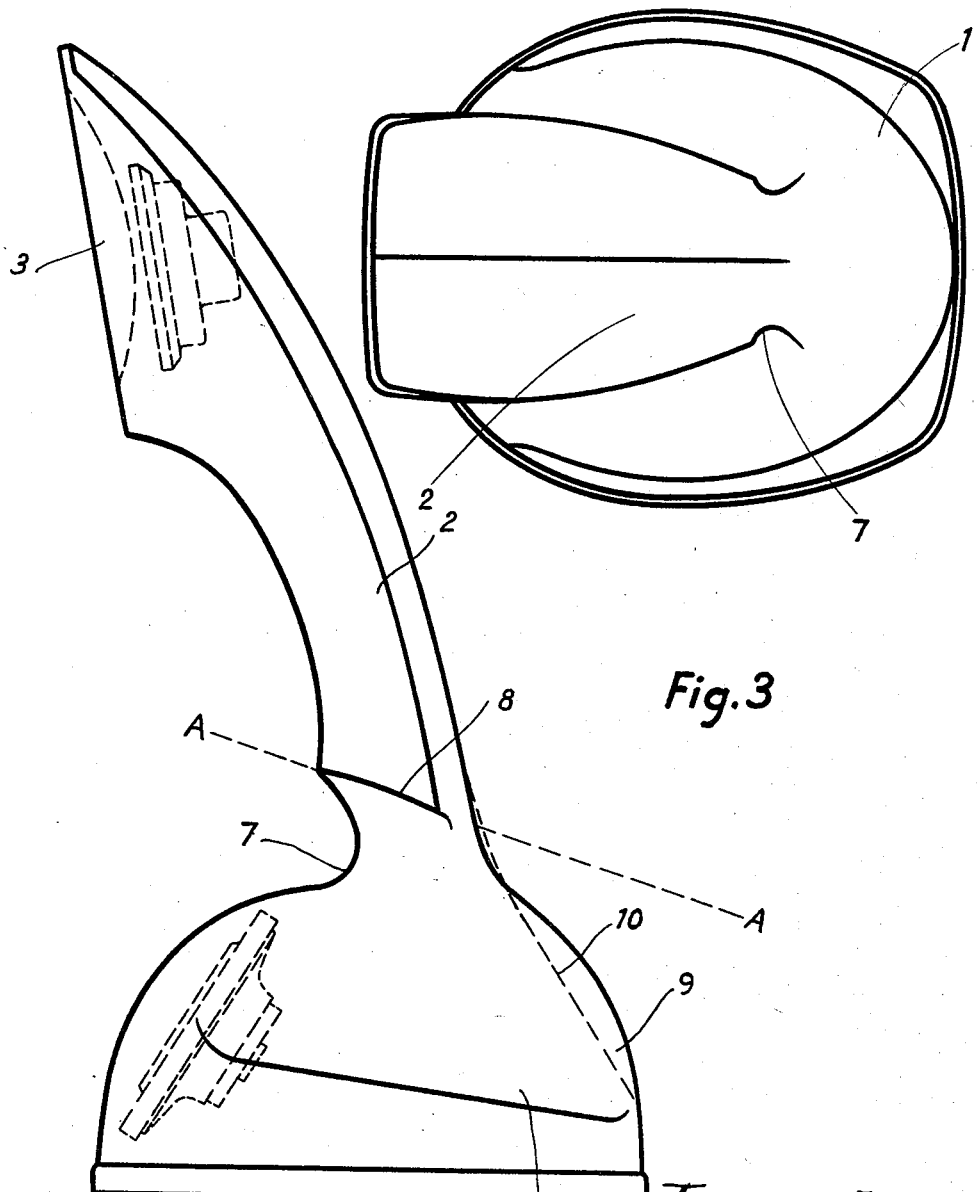
Figure 4:
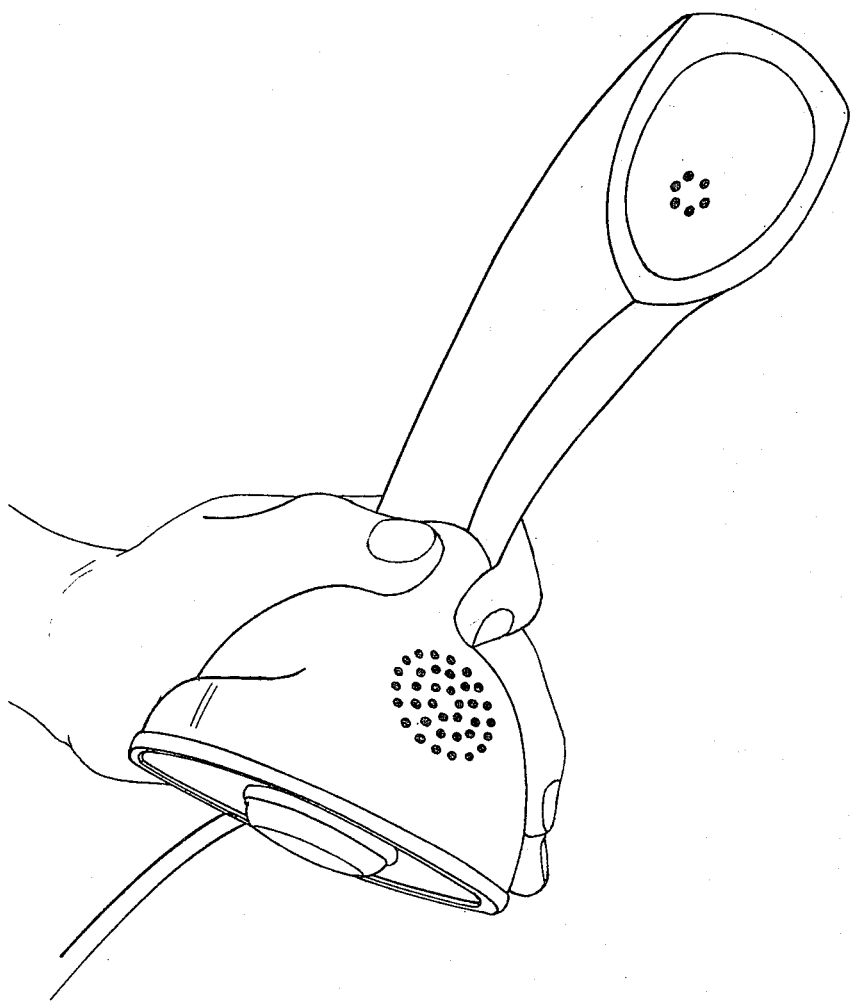

The invention will be more closely described with reference to the accompanying drawings, which show an embodiment. Fig. 1 is a front view of the instrument, Fig. 2 is a side view, Fig. 3 is a top-view of the instrument, Figs. 4 and 5 are perspective views showing the instrument held in the hand, whereby in Fig. 5 the instrument is shown in dialling position. 1 indicates the hemispheroidal foot of the instrument and 2 the handle, which is leaning forwards somewhat, 3 indicates the ear cap and 4 the mouthpiece, 5 indicates the dial and 6 a button for switching the contact springs. At the juncture between the handle and the foot, the handle is provided with a groove 7, running on the front and the sides of the handle. In the embodiment shown on the drawing, the upper edge, or protruding side wall, 8 of the groove 7 is shaped so that a plane (A—A) including said edge 8 cuts the plane of the foundation at an acute angle behind the instrument. Thereby, the groove is given a direction which almost corresponds to the direction of the thumb when the hand is applied with its inside on the back of the foot, and when the fingers are closed round the instrument the thumb rests in the groove 7 on one side of the foot (see Fig. 4). The other fingers rest on the opposite side of the foot, the forefinger thereby possibly fitting in the groove 7 on the side opposite to the thumb. A firm and convenient grasp round the foot of the instrument is thereby achieved, which, as mentioned above, is a condition for a convenient handling of the instrument. As appears from the drawing, the back 9 of the foot is convex (seen from outside) and has been shaped so that the back firmly rests in the inside, or palm of the hand when the instrument has been grasped in the indicated manner and the hand has been turned a little, so that the instrument is in dialling position (see Fig. 5), the forearm thereby lying nearly horizontally.

By shaping the back of the foot in the above mentioned manner it is obtained, that when the instrument is held in dialling position, the plane of the dial will lie approximately perpendicularly to a line going from the eye to the centre of the dial, which facilitates the dialling. As appears from the drawing, the handle widens upwards like a funnel and the cross-section is shaped as a shield. The part 3 (the ear cap), which is to lie against the ear, and the plane of which forms an angle of about 80° with the plane of the dial, is not shaped as a screw cap, but it too has the shape of a shield, which shape is obtained due to the plane of the ear cap being a section of the handle. Said shape of the ear cap fits better the shape of the ear than the usual circular shape.

The invention may naturally be modified without departing from the scope of the inventive idea. Thus, the back of the foot may be plane, whereby the angle formed by said plane and the plane of the dial is preferably about 50–60°. The outline of the back of the foot in this case is given by the dotted line 10 in Fig. 2.

We claim:

1. A telephone instrument of the hand-set type having a normally upright handle, which at its upper portion is provided with a receiver portion which is adapted to lie against the ear, and at its lower part widens into a foot, and a microphone disposed behind and adjacent a front wall portion of the foot; characterized in that the handle, at the juncture between the handle and the foot, has a groove running along the front and continuing along the sides of the handle, the height of the groove in the longitudinal direction of the handle approximately corresponding to the width of the thumb, said groove having a protruding upper edge for preventing the thumb in said groove from sliding up said handle.

2. A telephone instrument of the standing hand-set type having a normally upright handle, an ear piece integrally formed at the upper end of said handle, a hemispheroidal base piece integrally formed at the lower end of said handle housing the necessary dialling and transducer components, a rearward portion of said base forming a rest surface for the inside of a hand during the lifting and holding of the instrument in various positions for dialling and talking, and a grooved receptacle distinctly formed at the junction of said handle and base for reception of a thumb and forefinger during the lifting and holding of the instrument in the various positions for dialling and talking, said grooved receptacle having a protruding upper side wall subjacent said handle for insuring the retention of said thumb and forefinger in said grooved receptacle.

References Cited in the file of this patent

UNITED STATES PATENTS

| | | |
|---|---|---|
| 1,077,225 | Keith | Oct. 28, 1913 |
| 1,941,237 | Weeber et al. | Dec. 26, 1933 |
| 1,958,668 | Lark | May 15, 1934 |
| 2,039,625 | Blount | May 5, 1936 |
| 2,124,615 | Foltz | July 26, 1938 |
| 2,183,744 | Hubbell | Dec. 19, 1939 |
| 2,405,543 | Blomberg | Aug. 6, 1946 |
| 2,419,388 | Blomberg | Apr. 22, 1947 |
| 2,511,786 | Patti | June 13, 1950 |